United States Patent
Lapinski et al.

(10) Patent No.: US 7,376,522 B2
(45) Date of Patent: May 20, 2008

(54) METHOD AND SYSTEM FOR DETERMINING THE DIRECTION OF FLUID FLOW

(75) Inventors: Sterling Lapinski, Louisville, KY (US); Deirdre Alphenaar, Louisville, KY (US); Susan Olson, Louisville, KY (US)

(73) Assignee: Genscape Intangible Holding, Inc., Louisville, KY (US)

( * ) Notice: Subject to any disclaimer, the term of this patent is extended or adjusted under 35 U.S.C. 154(b) by 0 days.

(21) Appl. No.: 11/470,419

(22) Filed: Sep. 6, 2006

(65) Prior Publication Data

US 2007/0294041 A1    Dec. 20, 2007

Related U.S. Application Data

(63) Continuation-in-part of application No. 10/967,737, filed on Oct. 18, 2004, now Pat. No. 7,274,996.

(60) Provisional application No. 60/512,649, filed on Oct. 20, 2003.

(51) Int. Cl.
*G06F 19/00* (2006.01)
*G01N 11/00* (2006.01)

(52) U.S. Cl. ............. 702/45; 73/152.58; 340/606; 374/119; 702/54; 702/100

(58) Field of Classification Search ............ 702/45, 702/47, 50, 51, 100, 48, 54; 73/152.58, 861.27, 73/861.29, 861.04; 340/606; 374/119
See application file for complete search history.

(56) References Cited

U.S. PATENT DOCUMENTS

| | | | | |
|---|---|---|---|---|
| 2,949,773 | A * | 8/1960 | Batchelder | 374/119 |
| 5,571,974 | A | 11/1996 | Nauful | |
| 5,741,980 | A | 4/1998 | Hill et al. | |
| 6,082,193 | A * | 7/2000 | Paulson | 73/152.58 |
| 6,917,891 | B2 * | 7/2005 | Rothfuss et al. | 702/100 |
| 6,995,677 | B2 * | 2/2006 | Aronstam et al. | 340/606 |

FOREIGN PATENT DOCUMENTS

GB     2082324     3/1982

* cited by examiner

*Primary Examiner*—John E Barlow, Jr.
*Assistant Examiner*—John H Le
(74) *Attorney, Agent, or Firm*—Stites & Harbison, PLLC; David W. Nagle, Jr.

(57) ABSTRACT

In an exemplary implementation of a method and system for determining the direction of fluid flow, one or more sound transducers are positioned in proximity to a conduit, each such sound transducer generating a signal representative of a selected characteristic of acoustic waves emanating from the conduit. Such signals are collected and analyzed to determine a threshold value for the selected characteristic (e.g., frequency) indicative of a change in the direction of fluid flow through the conduit. Based on whether subsequent measurements of the selected characteristic (e.g., frequency) are above or below the threshold value, the direction of fluid flow can be predicted and/or a change in the operational state of a component associated with the conduit can be identified.

20 Claims, 7 Drawing Sheets

METHOD AND SYSTEM FOR DETERMINING THE DIRECTION OF FLUID FLOW

CROSS-REFERENCE TO RELATED APPLICATIONS

The present application is a continuation-in-part of U.S. patent application Ser. No. 10/967,737 filed Oct. 18, 2004 now U.S. Pat No. 7,274,996, an application claiming priority to U.S. Provisional Patent Application Ser. No. 60/512,649 filed Oct. 20, 2003. Each of the above-referenced applications is incorporated herein by reference.

BACKGROUND OF THE INVENTION

The present invention relates to a method and system for determining the direction of fluid flow, such as fluid flow through pipelines or similar conduits for delivering natural gas, crude oil, and other liquid or gas energy commodities. The method and system relies on the measurement of acoustic frequencies generated by the fluid, thus allowing for determination of the direction of flow and/or identification of a change in the operational state of a component associated with the conduit without direct access to the fluid.

Natural gas, crude oil, and other similar liquid or gas energy commodities comprise a multi-billion dollar economic market. These commodities are bought and sold by many parties, and as with any traded market, information about the traded commodities is very valuable to market participants. Specifically, the operations of the various components and facilities of the production, transportation, storage, and distribution systems for each of these commodities can have significant impacts on the price and availability of these commodities, making information about said operations valuable. Furthermore, such information generally is not disclosed publicly by the various component owners or operators, and access to said information is therefore limited.

In co-pending and commonly assigned U.S. patent application Ser. No. 10/967,737 filed Oct. 18, 2004, which has been incorporated herein by reference, a method and system for monitoring fluid flow is described that relies on the measurement of acoustic waves generated by the fluid from a location external to the conduit in which the fluid is flowing, thus allowing for monitoring of the flow rate without direct access to the fluid. Furthermore, U.S. patent application Ser. No. 10/967,737 describes how to estimate the operational dynamics of components or facilities of the production, transportation, storage, and distribution systems for the energy commodities through such measurement of acoustic waves.

In general, fluids (whether compressible or incompressible) flowing through pipelines or similar conduits produce acoustic waves, i.e., sound or vibration. The sound produced by the flow of natural gas or other energy commodity can be characterized by its amplitude and frequency. In this regard, the amplitude and frequency are generally directly related to the velocity of the fluid through the conduit, along with the associated operational components (e.g., valves, compressors, and meters), and thus the flow rate of the fluid. Therefore, a sound transducer or similar sensor can be positioned to detect the acoustic waves emanating from a particular conduit caused by fluid flow through that conduit, and by recording and analyzing the acoustic waves, the flow rate through the conduit can be estimated. In this regard, the flow rate is commonly expressed as a volumetric flow rate, i.e., characterized as the volume of fluid passing by a designated point over a predetermined time period.

Therefore, according to the teachings of U.S. patent application Ser. No. 10/967,737, one or more sound transducers are positioned in proximity to a pipeline such that acoustic waves can be reliably detected. Each sound transducer detects the amplitude and/or frequency of the acoustic waves generated by the gas flow through the pipeline and generates a signal representative of that measurement. The signal generated by each sound transducer is transmitted to an above-ground monitoring device in general proximity to the sound transducers and the monitored pipeline. The monitoring device houses the various electronic equipment necessary to process the signals from the sound transducers and transmit collected data to a central processing facility. Specifically, the monitoring device is programmed such that it periodically or continuously collects data from the sound transducers, processes that data into a form suitable for transmission, and transmits the data to a remote central processing facility.

At the central processing facility, a computational analysis is performed by a digital computer program to determine the flow rate of the fluid through the monitored pipeline. Furthermore, for any particular facility or other component of the production, transportation, storage, and/or distribution system for which all, or most of, the connected pipelines are monitored, through a simple summing of the volumetric flow rates on each pipeline, the output or production of the facility can be determined. Then, information associated with the production or output of one or more facilities or components can be communicated to third parties. This information may include not only the measured flow rates or output estimates, but also historical data, capacity estimates, or similar data that places the measured flow rates or output estimates in context for market participants and other interested parties.

In some circumstances, mere knowledge of the direction of flow has value. For example, natural gas is located and collected by production companies from geographically dispersed wells. The natural gas collected from these wells is delivered through a network of pipelines (or similar conduits) and then delivered to storage facilities. Knowledge of whether natural gas is being injected into a storage facility or withdrawn from a facility can be very important to those involved in trading natural gas commodities, as the operational state of a storage facility is an indicator of the demand for natural gas.

SUMMARY OF THE INVENTION

The present invention relates to a method and system for determining the direction of fluid flow, such as fluid flow through pipelines or similar conduits for delivering natural gas, crude oil, and other liquid or gas energy commodities. The method and system relies on the measurement of acoustic frequencies generated by the fluid, thus allowing for determination of the direction of flow and/or identification of a change in the operational state of a component associated with the conduit without direct access to the fluid.

An exemplary method in accordance with the present includes the following steps: (1) positioning one or more sound transducers in proximity to a conduit, each such sound transducer generating a signal representative of a selected characteristic of acoustic waves emanating from the conduit; (2) collecting said signals from the sound transducers; (3) analyzing the collected signals to determine a threshold value for the selected characteristic (e.g., frequency) indicative of a change in the direction of fluid flow through the conduit; and (4) predicting the direction of fluid flow and/or identifying a change in the operational state of a component associated with the conduit based on whether subsequent measurements of the selected characteristic (e.g., frequency) are above or below the threshold value.

For example, and as mentioned above, natural gas is located and collected by production companies from geographically dispersed wells. The natural gas collected from these wells is delivered through a network of pipelines (or similar conduits) and then delivered to storage facilities. At any given time, natural gas may be injected into or withdrawn from the storage facility. Therefore, one or more sound transducers can be positioned on or near a selected segment of a pipeline near a storage facility. Once the threshold value for the selected characteristic (e.g., frequency) has been determined, changes in the operational state of the storage facility can de identified based on whether subsequent measurements of the selected characteristic (e.g., frequency) are above or below the threshold value.

DETAILED DESCRIPTION OF THE INVENTION

The present invention is a method and system for determining the direction of fluid flow, such as fluid flow through pipelines or similar conduits for delivering natural gas, crude oil, and other similar liquid or gas energy commodities. The method and system relies on the measured frequency of acoustic waves generated by the fluid flow, preferably from a location external to the conduit in which the fluid is flowing, thus allowing for determination of the direction of flow and/or identification of a change in the operational state of a component associated with the conduit without direct access to the fluid.

As discussed above, fluids (whether compressible or incompressible) flowing through pipelines or similar conduits produce acoustic waves, i.e., sound or vibration. Specifically, for fluid flowing though pipelines or similar conduits, mechanical, aerodynamic and/or hydrodynamic noise sources exist. Since pipeline machinery vibrations are typically controlled and attenuated by operational design under normal operating conditions, the focus for purposes of the present discussion is on aerodynamic or hydrodynamic noise sources.

Flow-induced noise sources result from flow through restrictions, including valves; expansions; splitters; dehydration and additive equipment; scrubbers; filters; straightening devices; and meters. The flow turbulence itself and the turbulent pressure fluctuations acting on the walls of the conduits, including pipe bends, are noise sources. In hydrodynamic flow, cavitation noise sources arise if the local fluid pressure drops below the vapor pressure. Additionally, compressor, turbine, and pump interactions with the fluid flow energy balance create aerodynamic noise sources.

If the operational state of a pipeline network component or facility differs for different flow directions, the mechanism of acoustic wave generation in the related conduits will change with flow direction. Indeed, a change in flow direction almost always results in a change in the acoustic characteristics unless the mechanisms for two different operations are identical, which is a statistically and practically rare situation. Therefore, a flow-induced acoustic signal measured at a point in space will differ in some aspect of its amplitude, phase, and/or frequency with a change in flow direction. In short, even at the same volumetric flow rate, a change in the operational states causes a change in the sustained and evanescent acoustic waves in the conduit.

For purposes of the present discussion, acoustic waves in a conduit can be characterized as falling into three categories: internal disturbances in the vicinity of the noise source; self-sustained, traveling waves; and plane wave resonances. Within thirty (30) hydraulic diameters of disturbance interacting with the flow, the internal disturbances dominate the acoustic field. M. P. Norton and A. Pruiti, "Universal Prediction Schemes for Estimating Flow-Induced Industrial Pipeline Noise and Vibration," Applied Acoustics, v.33 (1991), pp. 313-316 (hereinafter "Norton and Pruiti"). About fifty (50) diameters from any major noise sources, flow through a conduit reaches a fully developed, turbulent state for Reynolds numbers >4000 [Norton and Pruiti]. Three-dimensional, traveling pipe modes then become self-sustained by the random fluctuating pressure field caused by turbulence and the remnants of flow fluctuations induced by a noise source. The self-sustained regime exists up to several thousand pipe diameters away from the noise source, at which point only the turbulent pressure fluctuations associate with the flow itself generate the energy to sustain acoustic modes [Norton and Pruiti]. Finally, in a section of conduit where the length between two reflection points in a conduit is on the order of the wavelength of sound, plane wave resonances may occur.

Several aspects of the operational state of a pipeline network component or facility may affect the acoustic waves in a conduit. For example, four common mechanisms that affect the acoustic field are (1) equipment changes or adjustments (i.e., compressor or pump settings); (2) changes in fluid thermodynamic properties; (3) changes in flow velocity; and (4) changes in the waveguide geometry.

An equipment change, such as changing the rotational speed of a turbine blade in a compressor, will result in a change in the frequency content of the turbulent pressure fluctuation spectrum. The pressure fluctuation spectrum is the source for determining the spatio-temporal structure of both the decaying and self-sustaining acoustic modes [Norton and Pruiti]. Such equipment changes are also at times associated with the changing of the thermodynamic properties of the fluid flowing through the conduit. A flow velocity change may be caused, for instance, by changing the setting of a control valve, changing the momentum added to the flow by a compressor, or changing the existing pressure differential driving the flow through the conduit. The flow velocity change affects the frequency range and amplitude of the turbulent pressure spectrum, which determines which sustaining modes, plane waves, and/or flow-induced resonances are excited.

Acoustic resonances or standing waves in a waveguide are altered by the length between wave reflection points. Changing the location of a reflection point often happens with a change in the operational state. For example, in injection or withdrawal of natural gas into or from a storage facility (as further described below), an impedance mismatch occurs between the pipeline intersection with the storage facility. The second reflectivity point changes according to the operation due to the change in the stop valve configurations. Consequently, the length of the waveguide and the acoustic properties of the resonant modes are altered with the change in operational state.

With the possible exception of plane wave resonance, predicting the acoustic mode structure in a conduit due to turbulent, flow-induced sources requires knowledge of the turbulent pressure spectrum and an accurate model of the partial differential equations governing the acoustic modes. P. M. Morse and K. V. Ingard, Theoretical Acoustics (1968), pp. 492-523. Rather than analytically determining the acoustic modes that result for different operational states, the method and system of the present invention uses measured acoustic waves to associate observable, repeatable events to operational states.

Figure 1:
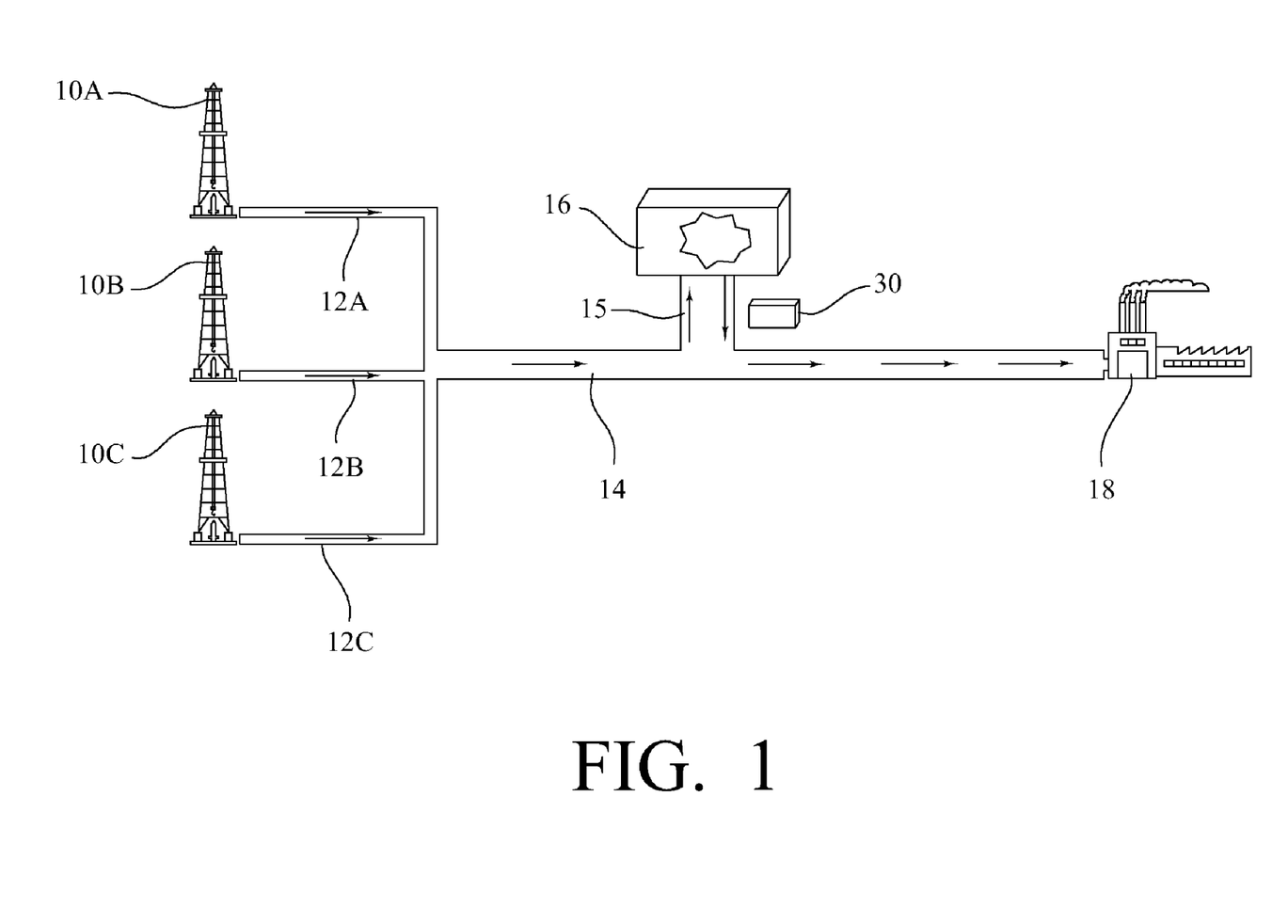
FIG. 1 is a schematic representation of a natural gas system.

For instance, with respect to the natural gas industry and as illustrated in FIG. 1, natural gas is located and collected by production companies from geographically dispersed wells, which are generally indicated by reference numerals 10A, 10B, and 10C in FIG. 1. The natural gas collected from these wells is delivered through a network of pipelines (or similar conduits) 12A, 12B, 12C to a primary trunk line 14. From such a trunk line 14, the natural gas is delivered to storage facilities 16, which are typically depleted natural gas fields, salt domes, or similar underground structures; and/or to local distribution companies 18, which in turn, sell and deliver the natural gas to industrial, commercial, and residential end users for ultimate consumption. With respect to storage, natural gas is either injected into or withdrawn from a storage facility 16. Accordingly, a pipeline 15 connecting a storage facility 16 to a trunk line is often configured for bi-directional flow.

Figure 2A:
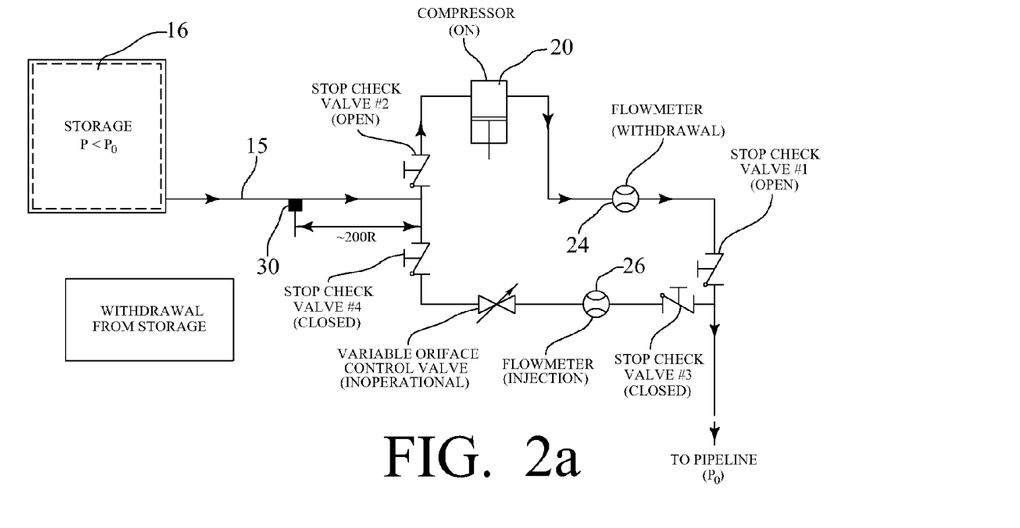
FIGS. 2a and 2b illustrate an exemplary configuration for controlling flow of natural gas into and out of a storage facility of a natural gas system.
Figure 2B:
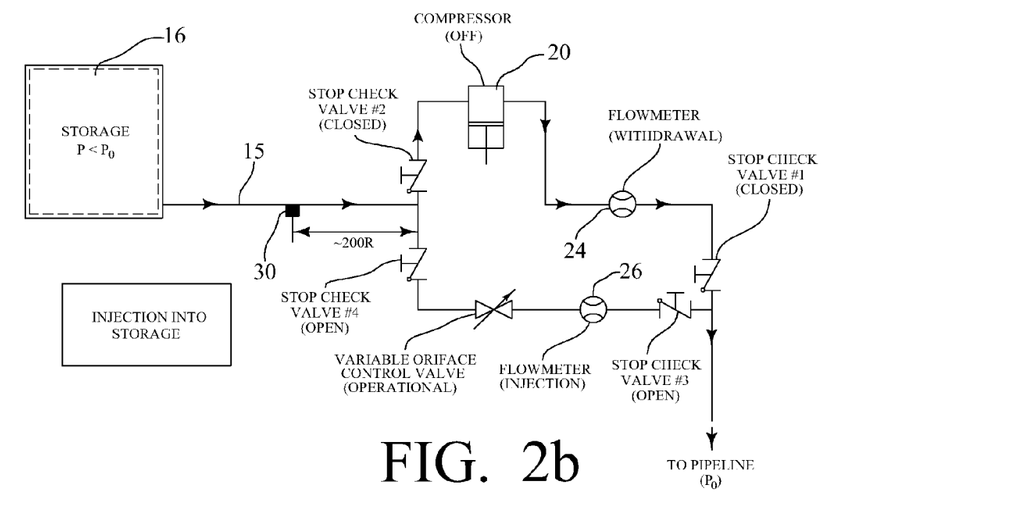

FIGS. 2a and 2b illustrate an exemplary configuration for controlling flow of natural gas into and out of a storage facility 16. FIG. 2a illustrates the valve settings for withdrawing natural gas from the storage facility 16, while FIG. 2b illustrates the valve settings for injecting natural gas into the storage facility 16. In withdrawing natural gas from a storage facility 16 or injecting natural gas into a storage facility 16, two techniques are commonly employed: (1) using a favorable pressure gradient between the storage facility 16 and the destination pipeline 15; or (2) using a pump, compressor, or similar mechanical device to move the flow against an unfavorable pressure gradient in the direction of transport. In the exemplary configuration illustrated in FIGS. 2a and 2b, compression is used for withdrawal of natural gas from the storage facility 16, while the existing pressure differential between the destination pipeline and the storage facility 16 is used for injection. During withdrawal, the applied power of the compressor 20 determines the volume withdrawn. During injection, a variable orifice control valve 22 is operated to control the injected volume. In either case, a flowmeter 24, 26 is used to provide feedback as to the volumetric flow rate entering or exiting the storage facility 16.

Of course, FIGS. 2a and 2b are intended to be illustrative of an exemplary configuration for controlling flow of natural gas into and out of a storage facility 16, but in practice, there may be various other equipment (for example, recycle valves, pipe bends, safety valves, etc.) involved in the withdrawal and/or injection operations. However, the omission of such additional equipment does not detract from the example as it is clear that when natural gas is withdrawn from the storage facility 16 as illustrated in FIG. 2a, the compressor 20 is on, but the variable orifice control valve 22 is not operational. When natural gas is injected into the storage facility 16 as illustrated in FIG. 2b, the compressor is off, but the variable orifice control valve is operational and is used to control the flow rate. Accordingly, withdrawal and injection operations produce different and distinct acoustic waves because of the use or non-use of the compressor 20 and variable orifice control valve 22.

To monitor and measure the acoustic waves produced by the withdrawal and/or injection operations, a sound transducer 30 is positioned in proximity to the a selected segment of the pipeline 15 near the storage facility 16, as illustrated in FIGS. 2a and 2b. In other words, the sound transducer 30 is placed in physical contact with the pipeline 15 or sufficiently close to said pipeline 15 such that acoustic waves can be reliably detected, as described in co-pending and commonly assigned U.S. patent application Ser. No. 10/967,737. For example, one preferred sound transducer suitable for the purposes of the present invention is a seismic, high-sensitivity accelerometer manufactured and distributed by PCB Piezotronics, Inc. of Depew, New York as Model No. 393B12.

In this case, the sound transducer 30 specifically detects the frequency of the acoustic waves generated by the gas flow through the pipeline 15 and generates a signal representative of that frequency. Then, as described in co-pending and commonly assigned U.S. patent application Ser. No. 10/967,737, that signal can be transmitted via an appropriate cable to an above-ground monitoring device, which is preferably "local" in that it is located in general proximity to the sound transducer 30, with data collected at the local monitoring device then being transmitted to a central processing facility.

Figure 3:
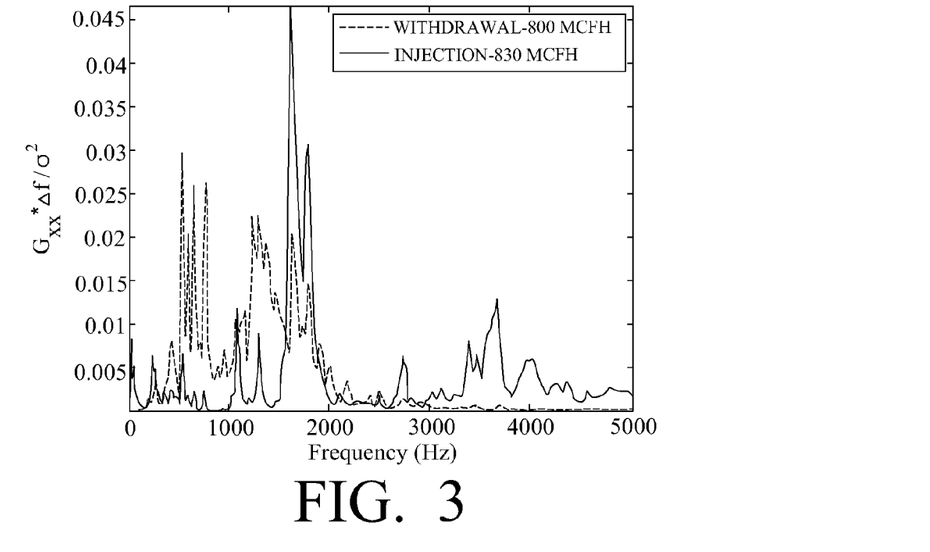
FIG. 3 is a chart showing a power density spectrum, $G_{xx}$, of the signal corresponding to withdrawal and injection operations in the exemplary configuration of FIGS. 2a and 2b.

To demonstrate the different and distinct nature of a withdrawal operation as compared to an injection operation, an experiment was conducted in which data was collected for the exemplary configuration illustrated in FIGS. 2a and 2b at nominally the same mass flow rate. FIG. 3 is a chart showing a power density spectrum, $G_{xx}$, of the signal corresponding to withdrawal and injection operations. The spectrum is normalized such that the ordinate axis represents the fraction of the signal standard deviation occurring at each discrete frequency. Specifically, the normalization uses the signal standard deviation, $\sigma$, and the discrete frequency resolution, $\Delta f$. The frequency content of the signal was different between the two operational states (i.e., withdrawal and injection) even at the same approximate flow rate. One notable feature distinguishing the frequency content is that the peak frequency is higher for injection than for withdrawal.

For further verification that the change in spectral content was repeatable over a wide range of flow rates, data was then collected for the exemplary configuration illustrated in FIGS. 2a and 2b for an approximately eight-month period, with measured signal amplitude, peak frequency, and peak frequency amplitude collected and transmitted to the central processing facility on a semi-hourly basis in the manner generally described in co-pending and commonly assigned U.S. patent application Ser. No. 10/967,737.

Figure 4A:
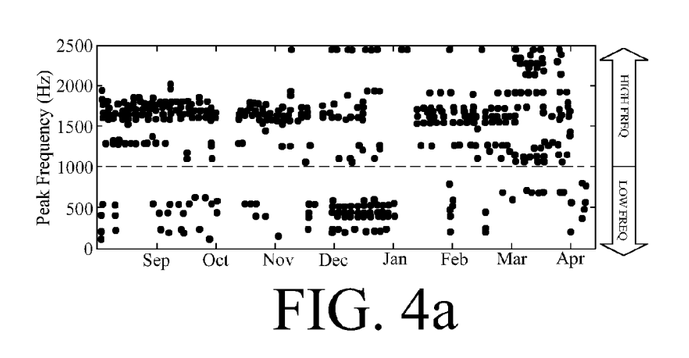
FIG. 4a is a chart of the raw peak frequency data obtained from the sound transducer in data collected over an extended time period for the exemplary configuration of FIGS. 2a and 2b.
Figure 4B:
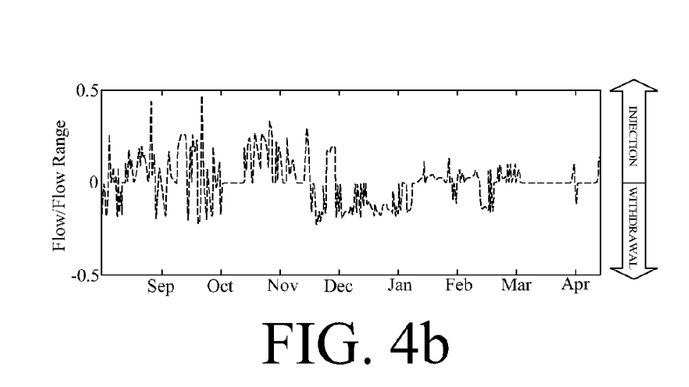
FIG. 4b is a chart of the volumetric flow rate at the operational standard pressure and temperature in data collected over an extended time period for the exemplary configuration of FIGS. 2a and 2b.

FIG. 4a is a chart of the raw peak frequency, f, data obtained from the sound transducer 30, while FIG. 4b is a chart of the volumetric flow rate at the operational standard pressure and temperature. In FIG. 4a, frequencies are clustered above and below 1000 Hz. The threshold, $f_{threshold}$, typifies a signature of the change in the acoustic mode structure caused by a change in the operational state of the storage facility 16. For this discussion, a frequency above the 1000 Hz threshold would be characterized as a "high frequency," while a frequency below the 1000 Hz threshold would be characterized as a "low frequency." Comparing FIG. 4a to FIG. 4b, it becomes apparent that the change in the operational state of the storage facility 16 is a change from withdrawal to injection, or vice versa. In short, withdrawal operations generally correspond to time periods in which the measured peak frequency was below the 1000 Hz threshold. Injection operations generally correspond to time periods in which the measured peak frequency was above the 1000 Hz threshold. In other words, based on the collected data, a threshold frequency could be identified so that future measurements of peak frequency could be used to identify the direction of flow into or out of the storage facility 16 through the pipeline 15, i.e., the operational state of the storage facility 16 with respect to the pipeline 15.

Figure 5:
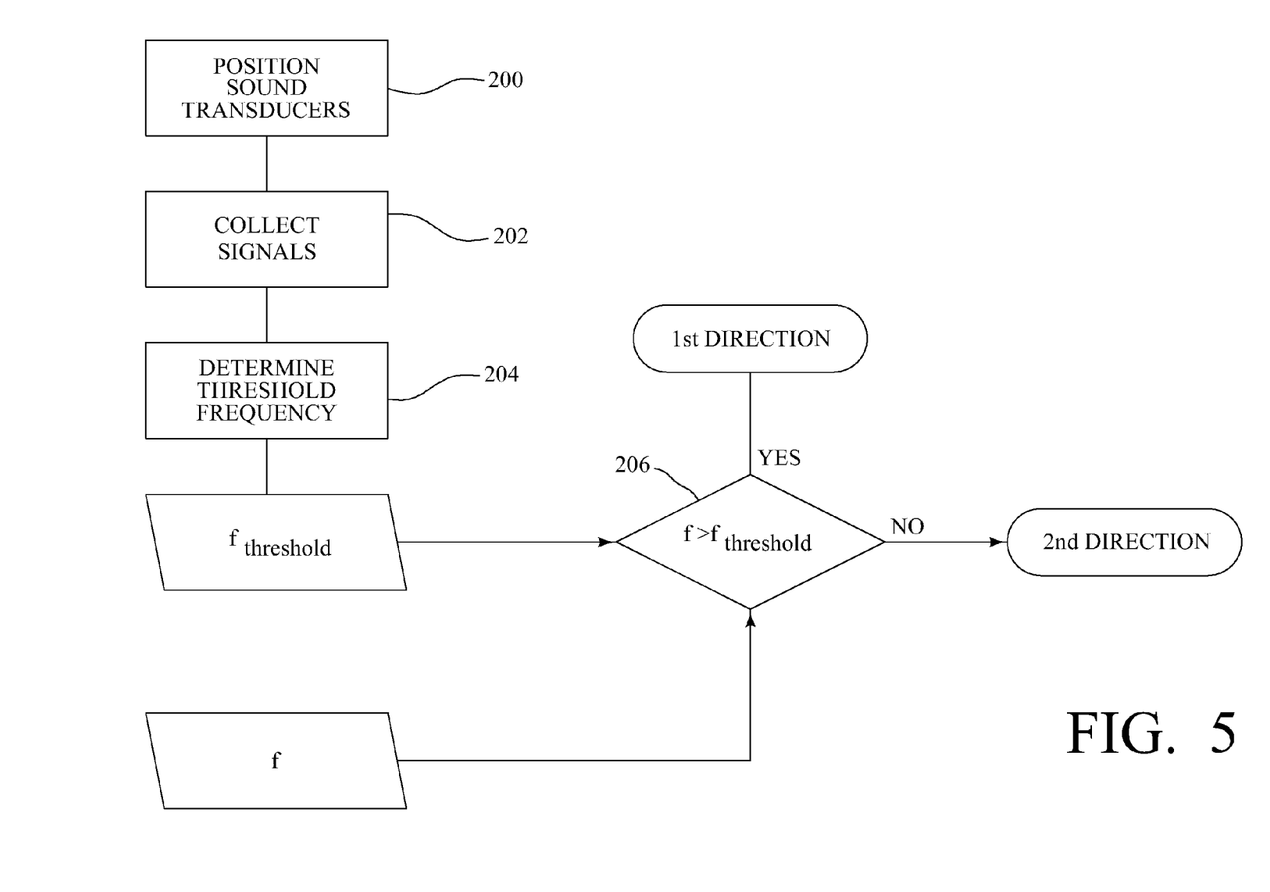
FIG. 5 is a flow chart illustrating an exemplary method for determining the direction of fluid flow in accordance with the present invention.

Accordingly, and as illustrated in FIG. 5, an exemplary method in accordance with the present includes the following steps: (1) positioning one or more sound transducers in proximity to a conduit, each such sound transducer generating a signal representative of a selected characteristic of acoustic waves emanating from the conduit, as indicated by block 200; (2) collecting said signals from the sound transducers, as indicated by block 202; (3) analyzing the collected signals to determine a threshold value for the selected characteristic (e.g., frequency) indicative of a change in the direction of fluid flow through the conduit, as indicated by block 204; and (4) predicting the direction of fluid flow (i.e., a first direction or a second direction) based on whether subsequent measurements of the selected characteristic (e.g., frequency) are above or below the threshold value, as indicated at comparison 206.

Returning to the above-described example of the withdrawal and/or injection operations associated with a natural gas storage facility 16, one or more sound transducers would be positioned on or near a selected segment of the pipeline 15 near the storage facility 16. Once the threshold frequency has been determined, changes in the operational state of the storage facility 16 can be identified based on whether subsequent measurements of the frequency are above or below the threshold value.

Figure 6:
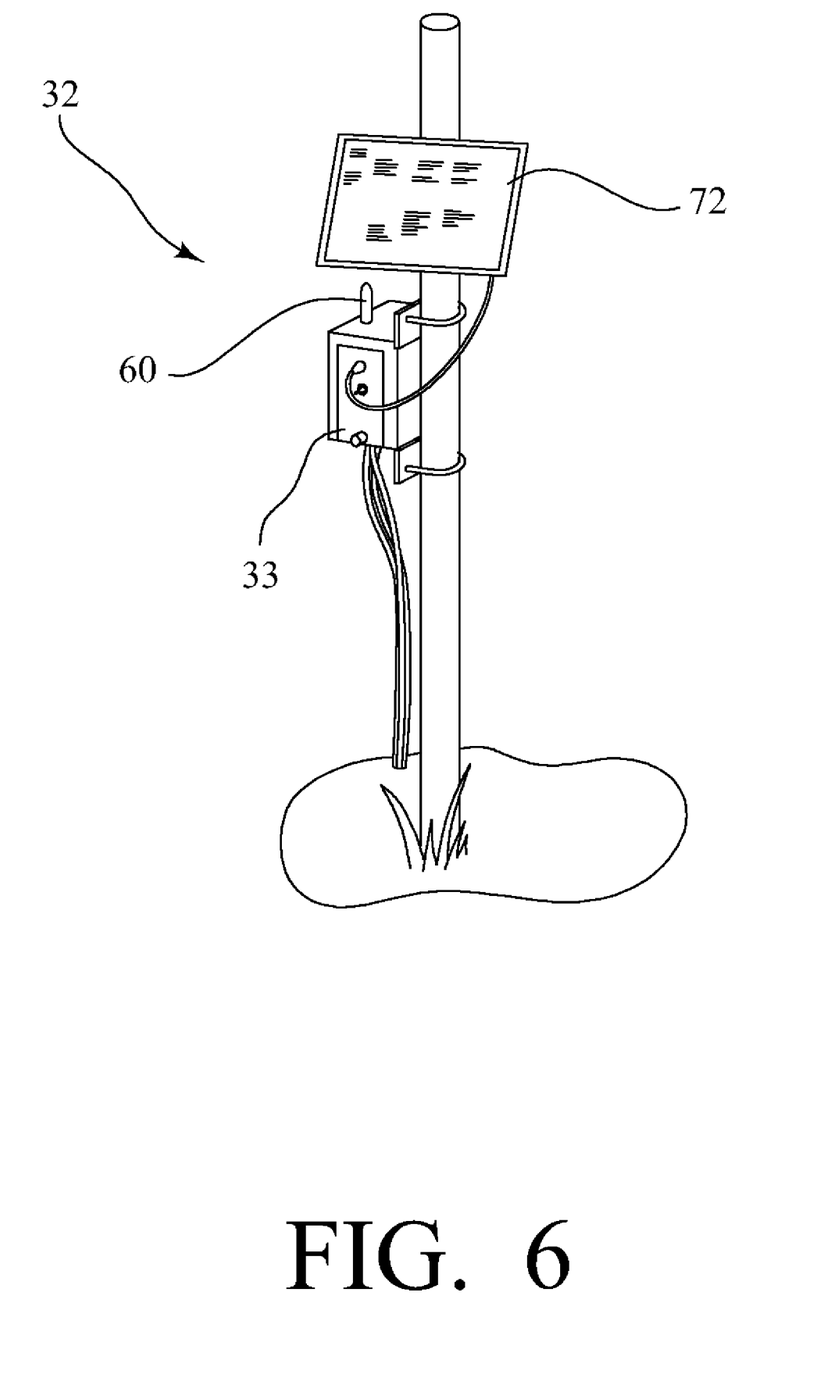
FIG. 6 is a perspective view of a monitoring device in an exemplary implementation of the method and system of the present invention.

Finally, as mentioned above and more fully described in co-pending and commonly assigned U.S. patent application Ser. No. 10/967,737, continued monitoring and measurement of the acoustic waves through the pipeline can be achieved through transmission of a signal from the sound transducer via an appropriate cable to an above-ground monitoring device 32, which is illustrated in FIG. 6. This exemplary monitoring device 32 is preferably "local" in that it is located in general proximity to the sound transducer 30, with data collected at the local monitoring device 32 then being transmitted to a central processing facility. As illustrated in FIG. 6, the exemplary monitoring device 32 includes a substantially weatherproof enclosure 33 that is secured to a post and houses the various electronic equipment necessary to process the signals from one or more sound transducers and to transmit collected data to a central processing facility.

Figure 7:
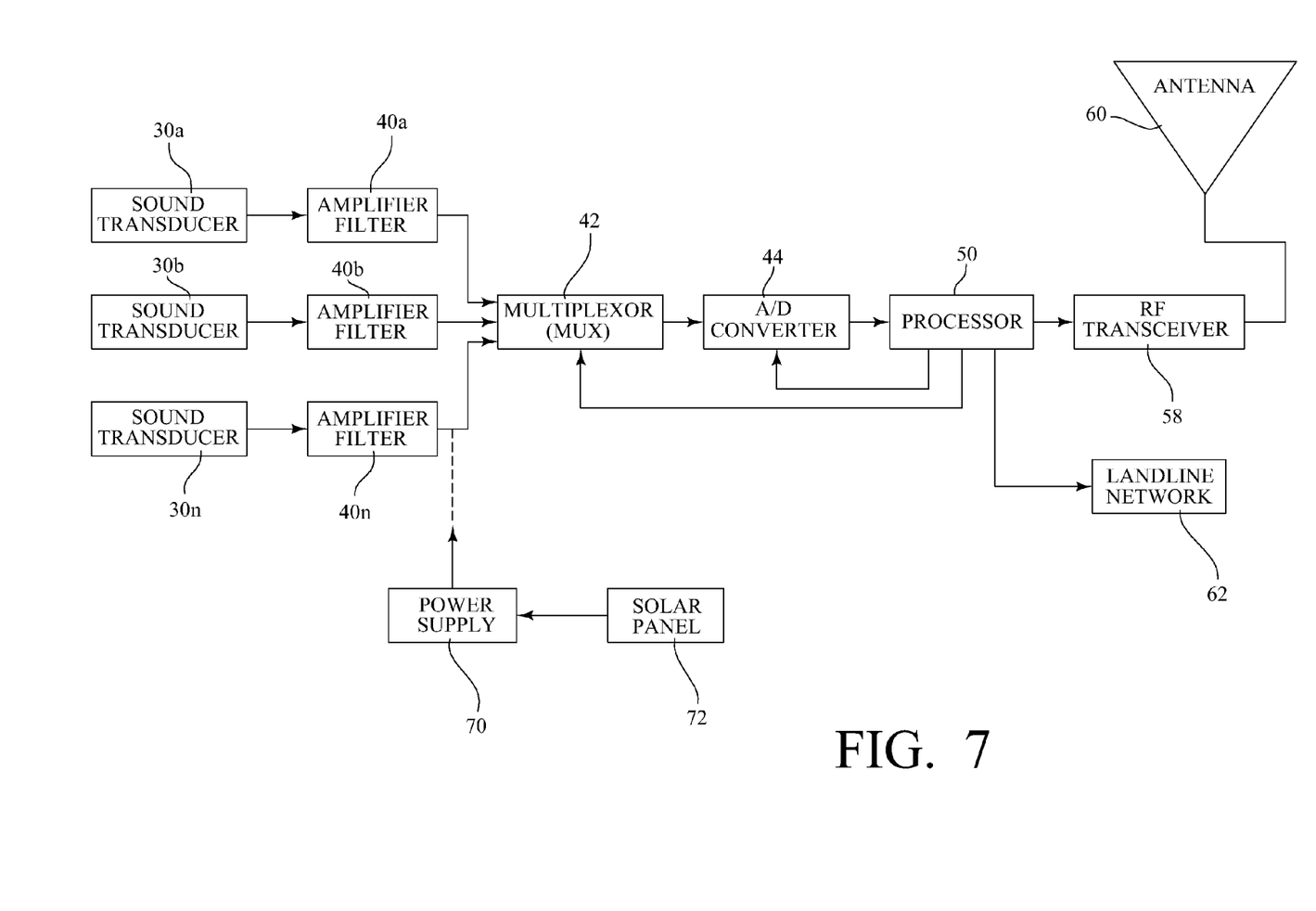
FIG. 7 is a functional block diagram of multiple sound transducers and the exemplary monitoring device in an exemplary implementation of the method and system of the present invention.

FIG. 7 is a functional block diagram of multiple sound transducers 30a, 30b . . . 30n and the monitoring device 32. As shown, the monitoring device 32 is programmed such that it periodically or continuously collects data from the sound transducers 30a, 30b . . . 30n, processes that data into a form suitable for transmission, and transmits the data to a remote central processing facility where various computational analyses can be performed on the data to determine the direction of flow or other characteristics of the flow of natural gas or other energy commodity through the monitored pipeline.

Specifically, the output voltage of the first sound transducer 30a is applied to a amplification and filtration circuit 40a, which has a dual function. One function of the amplification and filtration circuit 40a is to amplify the relatively small output voltage of the sound transducer 30a to a level that will be suitable as an input to an analog-to-digital converter. The secondary function of the circuit 40a is to serve as a filter, removing extraneous noise from the output voltage of each sound transducer 30a. Similarly, the output voltage of the second sound transducer 30b is applied to another amplification and filtration circuit 40b to amplify the voltage and remove extraneous noise, and so on. The specific design of the amplification and filtration circuits 40a, 40b . . . 40n is immaterial, and various amplification and filtration circuits could be designed to achieve the dual objectives of amplifying the voltage and removing extraneous noise by one of ordinary skill in the art.

After the amplification and filtration of the respective signals, the output voltages are then applied to the inputs of an analog multiplexer (MUX) 42. Furthermore, although not shown in FIG. 7, it may be advisable to apply the output voltages of the respective amplification and filtration circuits 40a, 40b . . . 40n to the inputs of respective sample-and-hold amplifiers before such output voltages are applied to the MUX 42 in order to avoid time-skew in the subsequent conversion of these signals from analog to digital form. Sample-and-hold amplifiers are generally known in the art, and any conventional means for performing the sample-and-hold function maybe incorporated into the present invention as contemplated herein.

From the MUX 42, the signals are separately passed through to an analog-to-digital (A/D) converter 44. Which of the multiple signals is passed through to the analog-to-digital converter 44 at any given time is determined by a control logic associated with a microprocessor 50. The converted data, representative of the frequency (or other characteristic) of the measured acoustic waves and now in digital form, is stored in memory associated with the microprocessor 50. The outputted signal from the microprocessor 50 is then transmitted to one or both of a radio frequency (RF) transceiver 58 with associated transmission antenna 60

(which is also shown in FIG. 6) and a landline network 62 for subsequent transmission of the signal to a central processing facility.

Lastly, the individual electronic components of the monitoring device 32 are preferably powered by a battery 70 that may be continuously recharged by a solar panel array 72 (which is also shown in FIG. 6).

Figure 8:
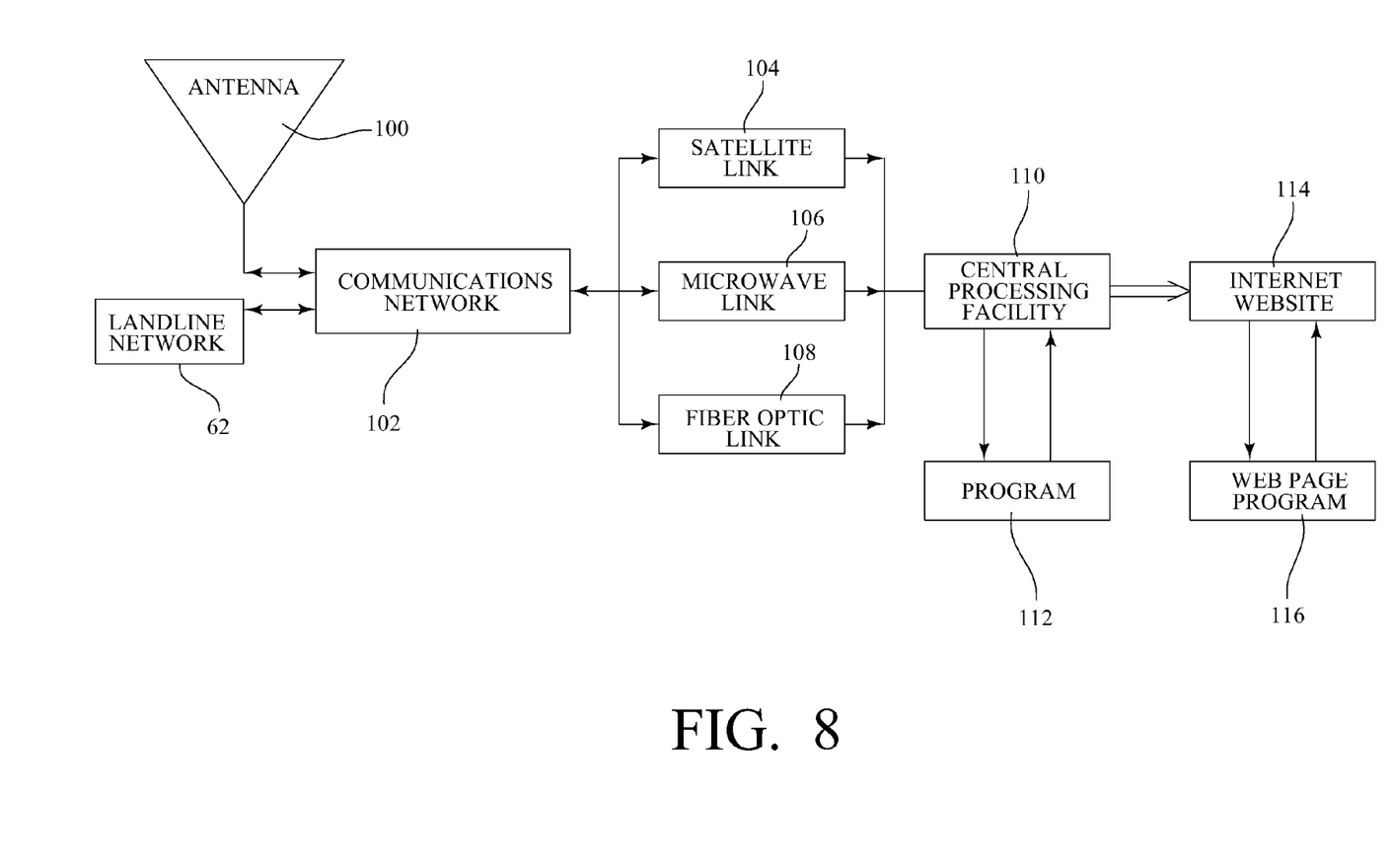
FIG. 8 is a functional block diagram of the communication components and the central processing facility in an exemplary implementation of the method and system of the present invention.

FIG. 8 is a functional block diagram of the communication components and the central processing facility in this exemplary implementation of the method and system of the present invention. These components are not installed in the field with the monitoring device 32, but rather are located at some remote location. Specifically, the outputted data from the microprocessor 50 depicted in FIG. 7 is transmitted to the central processing facility via one or both of a radio frequency (RF) transceiver 58 with associated transmission antenna 60 and a landline network 62. A receiving antenna 100 or similar communication component, which is in range of one or more monitoring devices 32 in the field, receives this data, which is representative of the acoustic measurements. The receiving antenna 100 is operably connected to an analog or digital communications network 102 which transmits the signal to the central processing facility 110. Such transmission may be carried out, for example, by a satellite link 104, a microwave link 106, and/or a fiber optic link 108, although other data transmission means may certainly be used without departing from the spirit and scope of the present invention.

At the central processing facility 110, various computational analyses can be performed on the data, including: (a) determining the threshold frequency indicative of a change in the direction of fluid flow through the conduit; (b) predicting of the direction of fluid flow based on subsequent measurements; and/or (c) identifying a change in the operational state of a component associated with the conduit based on whether measured frequencies are above or below the threshold frequency.

Finally, information about the direction of fluid flow through a particular conduit and/or the operational state of a pipeline network component or facility can be communicated to third parties. It is contemplated and preferred that such communication to third parties be through export of the data to an access-controlled Internet web site 114, which end users can access through a common Internet browser program 116, such as Microsoft Internet Explore®. Of course, communication of information and data to third parties may also be accomplished through a wide variety of other known communications media without departing from the spirit and scope of the present invention.

Again, in the above example, the focus was on the measured frequencies of acoustic waves emanating from a conduit; however, other characteristics of the acoustic waves, such as amplitude or phase, could also be used to predict the direction of fluid flow through the conduit and/or identify a change in the operational state of a component (e.g., a storage facility) associated with the conduit without departing from the spirit and scope of the present invention.

One of ordinary skill in the art will recognize that additional embodiments and/or implementations are possible without departing from the teachings of the present invention or the scope of the claims which follow. This detailed description, and particularly the specific details of the exemplary implementation disclosed therein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A method for determining a direction of fluid flow through a conduit, comprising the steps of:
    positioning one or more sound transducers in proximity to and external to said conduit, each said sound transducer generating a signal representative of a selected characteristic of acoustic waves emanating from the conduit as generated by the fluid flow through the conduit;
    collecting signals from said one or more sound transducers;
    analyzing the collected signals to determine a threshold value of the selected characteristic indicative of a change in the direction of fluid flow through the conduit;
    predicting the direction of fluid flow through the conduit based on whether subsequent measurements of the selected characteristic are above or below the threshold value; and
    communicating information relating to the predicted direction of fluid flow through the conduit to a third party.

2. The method as recited in claim 1, in which the selected characteristic is peak frequency.

3. The method as recited in claim 1, in which communicating information to said third party is accomplished through export of the information to an Internet web site accessible by said third party.

4. The method as recited in claim 1, in which signals generated by said one or more sound transducers are collected by a local monitoring device and then transmitted from the local monitoring device to a remote central processing facility for analyzing the collected signals to determine the threshold value of the selected characteristic and predicting the direction of fluid flow through the conduit based on subsequent measurements of the selected characteristic.

5. The method as recited in claim 1, in which said one or more sound transducers are near, but not in physical contact with, said conduit.

6. A method for monitoring an operational state of a component of production, transportation, storage, and/or distribution systems for an energy commodity, comprising the steps of:
    positioning a sound transducer in proximity to and external to a conduit associated with the component, said sound transducer generating a signal representative of a selected characteristic of acoustic waves emanating from the conduit as generated by fluid flow through the conduit;
    collecting said signals from the sound transducer;
    analyzing the collected signals to determine a threshold value of the selected characteristic indicative of a change in the direction of fluid flow through the conduit, and thus indicative of a change in the operational state of the component;
    predicting the direction of fluid flow through the conduit based on whether subsequent measurements of the selected characteristic are above or below the threshold value;
    identifying a change in the operational state of the component based on the predicted direction of fluid flow; and
    communicating information relating to the operational state of the component to a third party.

7. The method as recited in claim 6, in which the selected characteristic is peak frequency.

8. The method as recited in claim 6, in which communicating information to said third party is accomplished through export of the information to an Internet web site accessible by said third party.

9. A method for monitoring an operational state of a component of a natural gas system, comprising the steps of:
positioning a sound transducer in proximity to and external to a conduit associated with the component of the natural gas system, said sound transducer generating a signal representative of a selected characteristic of acoustic waves emanating from the conduit as generated by fluid flow through the conduit;
collecting said signals from the sound transducer;
analyzing the collected signals to determine a threshold value of the selected characteristic indicative of a change in the direction of fluid flow through the conduit;
predicting the direction of fluid flow through the conduit based on whether subsequent measurements of the selected characteristic are above or below the threshold value; and
communicating information relating to the predicted direction of fluid flow through the conduit to a third party.

10. The method as recited in claim 9, wherein the component of the natural gas system is a storage facility.

11. The method as recited in claim 9, in which the selected characteristic is peak frequency.

12. The method as recited in claim 9, in which communicating information to said third party is accomplished through export of the information to an Internet web site accessible by said third party.

13. A method for monitoring an operational state of a component of a natural gas system, comprising the steps of:
positioning a sound transducer in proximity to and external to a conduit associated with the component of the natural gas system, said sound transducer generating a signal representative of a selected characteristic of acoustic waves emanating from the conduit as generated by fluid flow through the conduit;
collecting said signals from the sound transducer;
analyzing the collected signals to determine a threshold value of the selected characteristic indicative of a change in the direction of fluid flow through the conduit;
predicting the direction of fluid flow through the conduit based on whether subsequent measurements of the selected characteristic are above or below the threshold value; and
communicating information relating to the operational state of the component of the natural gas system to a third party.

14. The method as recited in claim 13, in which communicating information to said third party is accomplished through export of the information to an Internet web site accessible by said third party.

15. A method for monitoring an operational state of a storage facility of a natural gas system, comprising the steps of:
positioning a sound transducer in proximity to and external to a conduit associated with the storage facility, said sound transducer generating a signal representative of a selected characteristic of acoustic waves emanating from the conduit as generated by fluid flow through the conduit;
collecting said signals from the sound transducer;
analyzing the collected signals to determine a threshold value of the selected characteristic indicative of a change in the direction of fluid flow through the conduit;
predicting the direction of fluid flow through the conduit based on whether subsequent measurements of the selected characteristic are above or below the threshold value; and
communicating information relating to the predicted direction of fluid flow through the conduit to a third party.

16. The method as recited in claim 15, in which the selected characteristic is peak frequency.

17. The method as recited in claim 15, in which communicating information to said third party is accomplished through export of the information to an Internet web site accessible by said third party.

18. A method for monitoring an operational state of a natural gas storage facility, comprising the steps of:
positioning a sound transducer in proximity to and external to a conduit associated with the storage facility, said sound transducer generating a signal representative of a selected characteristic of acoustic waves emanating from the conduit as generated by fluid flow through the conduit;
collecting said signals from the sound transducer;
analyzing the collected signals to determine a threshold value of the selected characteristic indicative of a change in the direction of fluid flow through the conduit, and thus indicative of a change in the operational state of the storage facility;
predicting the direction of fluid flow through the conduit based on whether subsequent measurements of the selected characteristic are above or below the threshold value;
identifying a change in the operational state of the storage facility based on the predicted direction of fluid flow; and
communicating information relating to the operational state of the storage facility to a third party.

19. The method as recited in claim 18, in which the selected characteristic is peak frequency.

20. The method as recited in claim 18, in which communicating information to said third party is accomplished through export of the information to an Internet web site accessible by said third party.

* * * * *